United States Patent
Eftimie et al.

(10) Patent No.: US 11,100,255 B1
(45) Date of Patent: Aug. 24, 2021

(54) METHOD AND APPARATUS FOR HIGH VOLTAGE PROTECTION

(71) Applicant: Dialog Semiconductor (UK) Limited, London (GB)

(72) Inventors: Sabin Eftimie, San Jose, CA (US); Gregory Fattig, Alamo, CA (US); Vivek Bhan, Saratoga, CA (US); Chanchal Gupta, Chandler, AZ (US)

(73) Assignee: Dialog Semiconductor (UK) Limited, London (GB)

(*) Notice: Subject to any disclaimer, the term of this patent is extended or adjusted under 35 U.S.C. 154(b) by 178 days.

(21) Appl. No.: 16/459,486

(22) Filed: Jul. 1, 2019

(51) Int. Cl.
| | |
|---|---|
| *G06F 21/75* | (2013.01) |
| *G06F 13/42* | (2006.01) |
| *G06F 21/44* | (2013.01) |
| *G06F 21/56* | (2013.01) |
| *G06F 21/85* | (2013.01) |

(52) U.S. Cl.
CPC ........ *G06F 21/755* (2017.08); *G06F 13/4282* (2013.01); *G06F 21/44* (2013.01); *G06F 21/567* (2013.01); *G06F 21/85* (2013.01); *G06F 2213/0042* (2013.01); *G06F 2221/034* (2013.01)

(58) Field of Classification Search
CPC ...... G06F 21/755; G06F 21/44; G06F 21/567; G06F 21/85; G06F 13/4282; G06F 2213/0042; G06F 2221/034; G06F 1/26; G06F 1/32
USPC .......................................................... 726/16
See application file for complete search history.

(56) References Cited

U.S. PATENT DOCUMENTS

| | | | | |
|---|---|---|---|---|
| 6,125,455 | A * | 9/2000 | Yeo ..................... | G06F 1/266 714/14 |
| 7,043,587 | B2 * | 5/2006 | Burke ................... | G06F 9/4411 710/260 |
| 8,935,774 | B2 * | 1/2015 | Belesiu ................. | G06F 1/26 726/16 |
| 9,990,325 | B2 * | 6/2018 | Hetzler ................. | G06F 3/0227 |
| 10,228,930 | B2 * | 3/2019 | Srinivasan ........... | H04L 63/1433 |
| 2008/0209547 | A1 * | 8/2008 | Funahashi ............ | G06F 21/78 726/20 |
| 2009/0200982 | A1 * | 8/2009 | Hurtz ................... | H02J 7/342 320/103 |
| 2010/0023744 | A1 * | 1/2010 | Markel ................. | G06F 21/85 713/2 |
| 2010/0075604 | A1 * | 3/2010 | Lydon .................. | G06F 21/31 455/41.3 |

(Continued)

OTHER PUBLICATIONS

Hansen, The Hacker's Hardware Tool Kit, downloaded from google; Published—Apr. 2019 (Year: 2019).*

(Continued)

*Primary Examiner* — Kambiz Zand
*Assistant Examiner* — Mahabub S Ahmed
(74) *Attorney, Agent, or Firm* — Saile Ackerman LLC; Stephen B. Ackerman

(57) ABSTRACT

Methods and systems are disclosed for protecting a host device from one or more power surges transmitted from a sink device. When a sink device is detected as being connected to the host device, a limited level of power is provided to the sink device over a power transmission line and the sink device is authenticated. A normal level of power is provided to the sink device only if the authentication is successful, otherwise a reduced level of power is provided.

16 Claims, 10 Drawing Sheets

(56) References Cited

U.S. PATENT DOCUMENTS

| | | | | |
|---|---|---|---|---|
| 2010/0235546 A1* | 9/2010 | Terlizzi | G06F 13/385 | 710/16 |
| 2011/0167281 A1* | 7/2011 | Rathi | H02J 7/0068 | 713/310 |
| 2012/0131353 A1* | 5/2012 | Nasir | G06F 21/43 | 713/189 |
| 2012/0166297 A1* | 6/2012 | Landers, Jr. | G06Q 20/209 | 705/24 |
| 2012/0278882 A1* | 11/2012 | Lydon | H04L 9/3263 | 726/17 |
| 2013/0080662 A1* | 3/2013 | Bourque | H04N 21/43635 | 710/10 |
| 2013/0232571 A1* | 9/2013 | Belesiu | G06F 1/263 | 726/21 |
| 2013/0278205 A1* | 10/2013 | Mullins | H04M 1/72409 | 320/107 |
| 2014/0075210 A1* | 3/2014 | Rich | G06F 1/26 | 713/300 |
| 2014/0103864 A1* | 4/2014 | Song | G06F 1/26 | 320/107 |
| 2014/0196142 A1* | 7/2014 | Louboutin | G06F 21/44 | 726/16 |
| 2014/0337558 A1* | 11/2014 | Powers | G06F 9/45558 | 710/313 |
| 2014/0344921 A1* | 11/2014 | Hamlin | G06K 9/00087 | 726/19 |
| 2015/0008749 A1* | 1/2015 | Rhee | H01R 29/00 | 307/80 |
| 2015/0137789 A1* | 5/2015 | Furtner | G06F 1/266 | 323/318 |
| 2015/0331463 A1* | 11/2015 | Obie | G06F 1/266 | 713/300 |
| 2015/0346792 A1* | 12/2015 | Rathi | G05F 1/625 | 713/310 |
| 2015/0363339 A1* | 12/2015 | Huang | G06F 13/20 | 710/33 |
| 2016/0370835 A1* | 12/2016 | Erickson | G06F 13/385 | |
| 2017/0103197 A1* | 4/2017 | Degura | G06F 21/81 | |
| 2018/0004696 A1* | 1/2018 | Lee | G06F 13/4022 | |
| 2018/0089123 A1* | 3/2018 | Kulkarni | G06F 13/4282 | |
| 2018/0150121 A1* | 5/2018 | Basterash | H02J 7/0042 | |
| 2018/0224912 A1* | 8/2018 | Wang | G06F 1/28 | |
| 2018/0341315 A1* | 11/2018 | Suganuma | G06F 1/3253 | |
| 2018/0356873 A1* | 12/2018 | Regupathy | G06F 1/3287 | |
| 2019/0033953 A1* | 1/2019 | Kadgi | G06F 1/3287 | |
| 2019/0052105 A1* | 2/2019 | Wang | H02J 7/00036 | |
| 2019/0199884 A1* | 6/2019 | Shimamura | H04N 1/00965 | |
| 2019/0215032 A1* | 7/2019 | Tanabe | G06F 21/44 | |
| 2019/0237978 A1* | 8/2019 | Bober | H01R 13/7175 | |
| 2019/0258832 A1* | 8/2019 | Jung | H02M 3/1582 | |
| 2019/0303321 A1* | 10/2019 | Ismail | G06F 13/20 | |
| 2020/0073455 A1* | 3/2020 | Na | G06F 1/263 | |
| 2020/0092282 A1* | 3/2020 | Childress | G06F 21/32 | |
| 2020/0233984 A1* | 7/2020 | Kalenderidis | G06F 21/32 | |
| 2020/0249742 A1* | 8/2020 | Mills | G06F 1/3215 | |
| 2020/0257600 A1* | 8/2020 | Camiolo | G06F 13/382 | |
| 2020/0358634 A1* | 11/2020 | Lee | H04W 4/50 | |
| 2020/0364023 A1* | 11/2020 | Dai | G06F 3/147 | |
| 2020/0410139 A1* | 12/2020 | Du | G06F 21/554 | |
| 2021/0057925 A1* | 2/2021 | Komoriya | H02J 50/80 | |

OTHER PUBLICATIONS

Wang, et al., Attestation & Authentication for USB Communications, 2012 IEEE Sixth International Conference on Software Security and Reliability Companion (Year: 2012).*

Tian et al., SoK: "Plug & Pray" Today—Understanding USB Insecurity in Versions 1 through C, 2018 IEEE Symposium on Security and Privacy (Year: 2018).*

Nissim et al, USB-based attacks, ScienceDirect (www.sciencedirect.com) (Year: 2017).*

He, USB Port and Power Delivery—An Overview of USB Port Interoperabiliy, IEEE (Year: 2015).*

"USB Killer V3," found: http://usbkill.com/products/usb-killer-v3, copyright 2019, pp. 1-5.

Microchip AN1953, "Introduction to USB Type-C™," by Andrew Rogers, 2015 Microchip Technology Inc., pp. 1-20.

Texas Instruments, Nov. 2016, "A primer on USB Type-C and Power Delivery applications and requirements," by Nate Enos et al., 17 pages.

* cited by examiner

| Limited Level of Current | Time to first pulsed attack | Voltage over power transmission line after startup |
|---|---|---|
| 1A or more | 60 milliseconds | 5V |
| 500mA | 80 milliseconds | 5V |
| 400mA | 100 milliseconds | 5V |
| 350mA | 150 milliseconds | 5V |
| 300mA | 0.3 seconds | 5V |
| 250mA | 0.8 seconds | 5V |
| 200mA | 1.2 seconds | 5V |
| 150mA | 2.5 seconds | 5V |
| 100mA | Non-available | 2.1V |
| 50mA | Non-available | 1.9V |

FIG. 7

METHOD AND APPARATUS FOR HIGH VOLTAGE PROTECTION

TECHNICAL FIELD

The present disclosure relates to methods and apparatus for high voltage protection. In particular, but not exclusively, the present disclosure relates to methods and apparatus for detecting and protecting against malicious high voltage USB devices.

BACKGROUND

The Universal Serial Bus (USB) standard defines cables, connectors and communications protocols for use in connecting devices, for example, connecting a USB flash or a phone to a tablet, desktop or laptop computer.

A USB connection between devices can be used both for the exchange of data and for the transmission of power. Whenever two devices are connected via a USB connection, a communication link is established. The device controlling the communication link is the host or master, while the other is the peripheral or slave. When the peripheral device is drawing power from the host device, it may also be called a "sink" device.

USB on-the-go (OTG) is a specification that allows USB devices to exchange roles during the connection, so that a device initially acting as a host might start acting as a sink or the other way around. USB OTG has become increasingly popular following the widespread diffusion of portable devices.

USB connector lines normally comprise at least a power transmission line, a ground line and a pair of data lines for the transmission of differential data signals. The power transmission line is commonly denoted VBUS and the differential lines are commonly denoted D+/D−. Most modern USB connections also comprise additional lines, such as configuration lines for the discovery, configuration and management of connections and additional pairs of data transfer lines for transmitting data at higher speed than the standard data lines D+/D−.

It is known to include electrostatic discharge (ESD) protection and transient voltage suppression (TVS) diodes on the USB connector lines, to protect in case of accidental high voltage discharges. These protection devices, however, are usually not designed to handle malicious high voltage attacks on the data communication line.

There exist in particular some malicious devices that are configured to deliver a high energy on the communication lines. Some malicious devices, are manufactured to appear to be a USB flash drive and are configured to send high-voltage power surges into the device they are connected to, threatening to damage hardware components. In some cases, the malicious device is specifically configured to draw power from the host device that it is connected to in order to build up an internal power reserve and, when a high enough power reserve is obtained, discharge high voltage surges onto the data communication lines of the USB connection. For example, some malicious devices have internal capacitors that can store over 200 Volts.

In order to provide protection against these malicious devices, and to prevent damage to the USB lines and to any component connected to the USB pins, the regular ESD circuits and TVS diodes would have to be very large and expensive.

Another known way of protecting the sensitive interface circuits and connector lines from power surges is by putting optical transceivers on the connecting lines. An optical transceiver is a device that converts electrical signals into optical signals so that, if a voltage surge occurs, the lines are protected. However, this solution is expensive and requires converting the optical signal back to an electrical signal, which can introduce unwanted complexity when used over the data communication lines.

Some host devices perform an authentication test whenever a device is connected to them and they prevent the transmission of power if the authentication test fails. However, authentication tests may take up to 500 ms which could be longer than the time it takes for some malicious devices to build up its high voltage charge for the attack. Moreover, it is claimed that some malicious devices are able to bypass the authentication tests, e.g. by delaying and/or prolonging the authentication long enough to accumulate the minimum power required to carry out an attack.

SUMMARY

It is an object of the disclosure to address one or more of the above-mentioned limitations. The present disclosure applies in particular, but not exclusively, to a universal serial bus (USB) connection between a host device and a plugin device, and even more particularly to a USB 3.0 connection.

According to a first aspect of the present disclosure, there is provided a method for protecting a host device from one or more power surges transmitted from a sink device that is connectable to the host device via a power transmission line and a data communication line; the method comprising: upon detection of the sink device being connected to the host device: providing a limited level of power to the sink device over the power transmission line; starting an authentication test of the sink device; if the sink device passes the authentication test, providing a normal level of power to the sink device over the power transmission line; and if the sink device fails the authentication test, providing a level of power to the sink device over the power transmission line that is the same or less than the limited level of power.

Optionally, the host device is configured to complete the authentication test within a maximum authentication time interval; and the authentication test is deemed to have failed if the maximum authentication time interval is exceeded before the authentication test has been completed.

Optionally, the maximum authentication time interval is adjustable.

Optionally, if the sink device fails the authentication test, the level of power provided to the sink device over the power transmission line is zero.

Optionally, the sink device comprises a component adapted to build up a power reserve from the power provided over the power transmission line; and the limited level of power is dependent on the time required to build up the power reserve.

Optionally, the component comprises an internal capacitor; and the internal capacitor discharges the stored power on the data communication line.

Optionally, the limited level of power provided to the sink device over the power transmission line comprises a limited level of current.

Optionally, the host device is connectable to the sink device via a USB connection.

Optionally, the method includes protecting the host device from a plurality of connections of the sink device.

Optionally, the host device includes a counter configured to count the number of connections.

Optionally, the counter is configured to count the number of connections within a counter time interval and to reset the count to zero each time the counter time interval is exceeded.

Optionally, the limited level of power is varied based on the current value of the counter.

Optionally, if the sink device fails the authentication test, the authentication test is reattempted up to a maximum attempts number.

Optionally, the maximum attempts number is adjustable.

Optionally, the host device is one of a phone, a tablet or a laptop; and the host device comprises a battery charger circuit and a boost converter; and the boost converter is configured to be reversible so as to provide power over the power transmission line when a sink device is connected to the host device.

According to a second aspect of the present disclosure, there is provided an apparatus for protecting a host device from one or more power surges transmitted from a sink device that is connectable to the host device via a power transmission line and a data communication line; wherein the apparatus comprises: a processor adapted to control the power transmitted via the power transmission line and to provide an authentication module, and wherein the processor is further configured to, upon detection of the sink device being connected to the host device: provide a limited level of power to the sink device over the power transmission line; start an authentication test of the sink device using the authentication module; if the sink device passes the authentication test, provide a normal level of power to the sink device over the power transmission line; and if the sink device fails the authentication test, provide a level of power to the sink device over the power transmission line that is the same or less than the limited level of power.

Optionally, the authentication module is configured to complete the authentication test within a maximum authentication time interval; and the authentication test is deemed to have failed if the maximum authentication time interval is exceeded before the authentication test has been completed.

Optionally, the processor is adapted to provide a current limiting module and the limited level of power comprises a limited level of current.

Optionally, the processor is adapted to protect the host device from a plurality of connections of the sink device.

Optionally, the processor is adapted to provide a counter and the counter is configured to count the number of connections of the sink device.

Optionally, the authentication module is configured to: if the sink device fails the authentication test, reattempt the authentication test up to a maximum attempts number.

BRIEF DESCRIPTION OF THE DRAWINGS

The disclosure is described in further detail below by way of example and with reference to the accompanying drawings, in which:

FIG. 7 is a table illustrating the working of the embodiment of FIG. 5;

DESCRIPTION

An embodiment of the present disclosure provides methods and apparatus that can reduce the risk of damage to a host device and to components of a USB interface of the host device when a malicious sink device is connected to the host device.

In the present disclosure, "host device" is intended to mean any device configured to be connected to a second device and capable of providing power to the second device. The term "sink device" means any device that is configured to be connected to a host device and receive power from the host device when it is connected to it. A "malicious" sink device is intended to mean any sink device specifically manufactured and configured to damage the host devices that it is connected to. However, within this specification, it also covers sink devices which accidentally transmit a power surge to the host device, such as a faulty device.

The term "power surge" is intended to mean any of a voltage or current spike or electrostatic discharge.

A "normal" level of power is a level of power in accordance with a level of power defined within the specifications of the sink device for a normal operation of the sink device. A "limited" level of power is any level of power that is lower than the normal level of power.

"Authentication test" means any process that queries the sink device to obtain an identification of the sink device via an exchange of information between the host device and the sink device.

Figure 1:
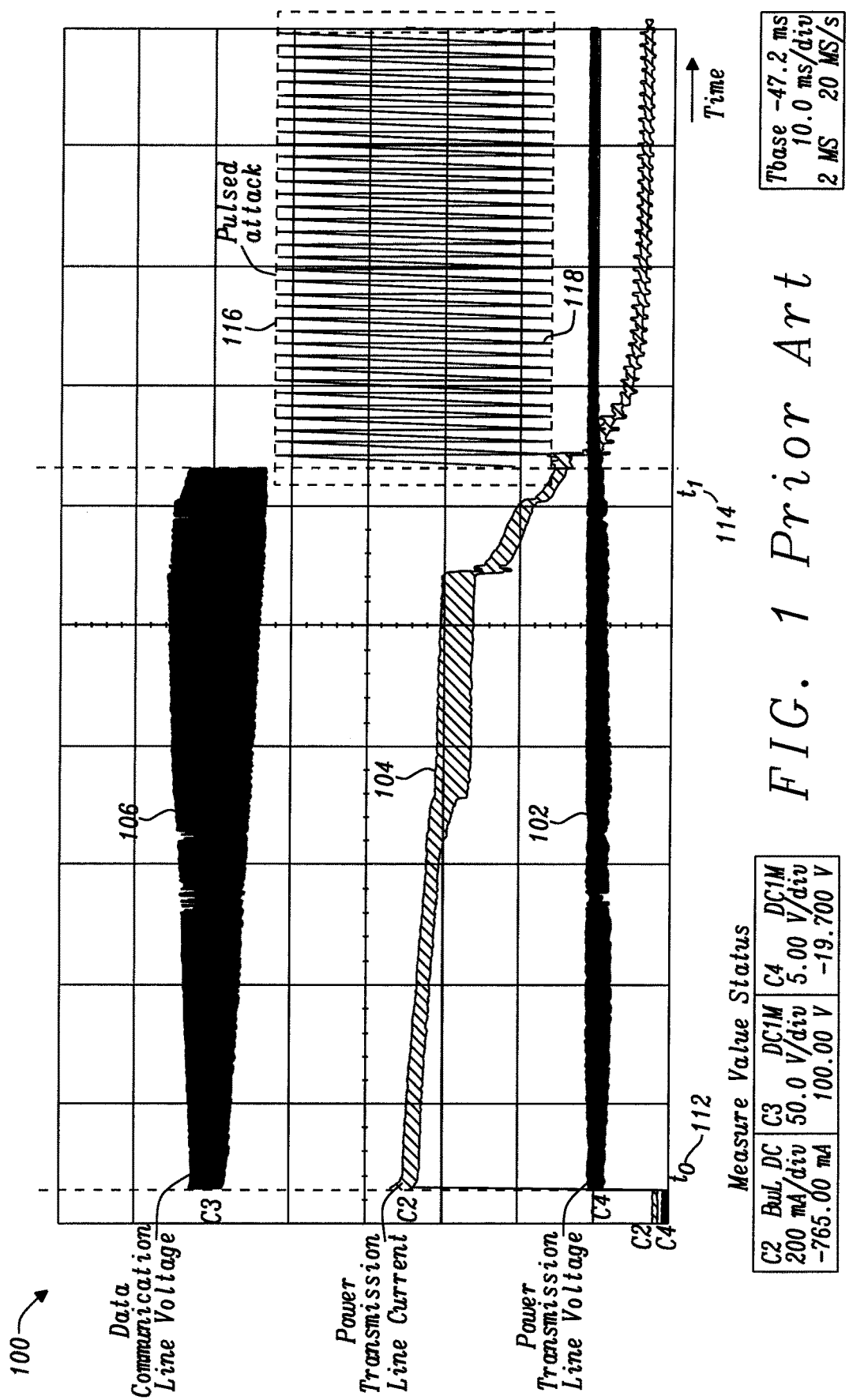
FIG. 1 shows measurements illustrating the workings of a malicious sink device when connected to a 5V power supply and to emulated data D+/D− lines.

FIG. 1 shows measurements illustrating the workings of a prior art host device and a malicious sink device. The graph 100 illustrates the temporal evolution of the voltage and the current over a data communication line and a power transmission line of a USB connection between a host device and a malicious sink device. In these measurements, the host device is configured to provide power to the malicious sink device over the power communication line. The malicious sink device comprises a component adapted to build up a power reserve from the power provided by the host device over the power transmission line and is configured to discharge the power stored in the component on the data communication line in a plurality of pulsed attacks. The component of the sink device might be for example a plurality of capacitors.

The line plots 102 and 104 are the voltage and current over the power transmission line respectively. The power transmission line is the line of the USB connection configured to transmit power from the host device, such as VBUS or VCONN. The line plot 106 is the voltage over the data communication line. The data communication line might be any line or differential line of the USB connection configured to transmit data between the host device and any sink device, such as D+/−.

At time $t_0$ (point 112 on the x axis) the sink device is connected to the host device via the USB connection and the host device starts an authentication test of the sink device. From the time $t_0$ and until a time $t_1$ (point 114 on the x axis) the host device provides power to the sink device over the power transmission line and the malicious sink device builds up a power reserve in its internal component.

At time $t_1$ the malicious sink device has accumulated enough power to carry out a first attack 116 to the host device and it starts sending harmful power surges 118 over the data communication line.

After the first pulsed attack 116, the sink device restarts building up the power reserve to carry out subsequent attacks. The malicious sink device is configured to continuously carry out attacks by repeating the power build-up/discharge cycle many times per second, until it is removed from the host device or until the host device is permanently damaged and not functioning anymore.

In the measurements of FIG. 1, the time $t_1$ is typically less than 100 milliseconds. In standard USB devices, the authentication test may take up to 500 milliseconds. Hence, a malicious sink device such as the one shown in FIG. 1 would be able to carry out multiple attacks to the host device before authentication test is completed and possibly damage the host device and/or the USB lines.

Figure 2:
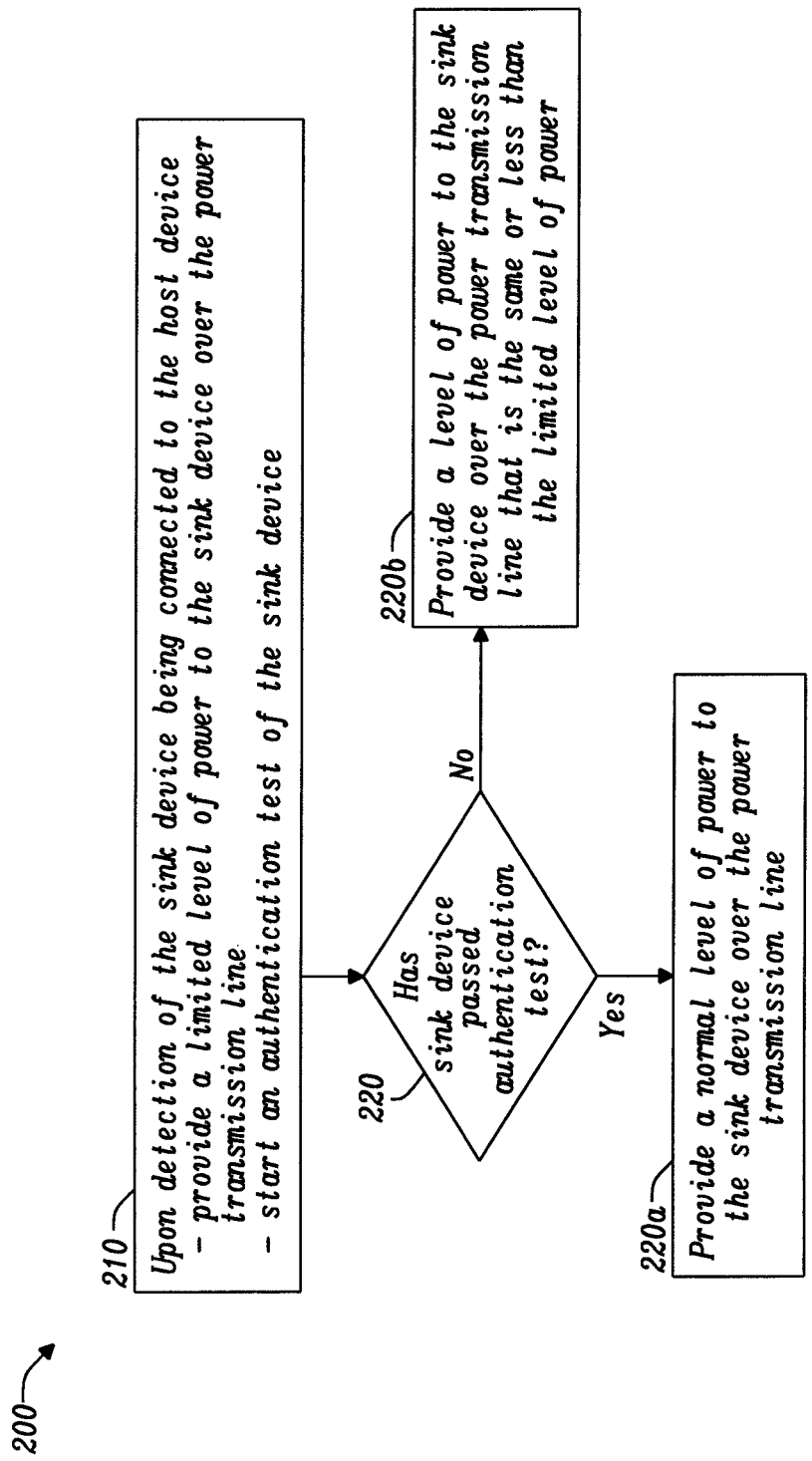
FIG. 2 is a diagram of a method according to the present disclosure.

FIG. 2 is a diagram of a method according to the present disclosure for protecting a host device from one or more power surges transmitted from a sink device that is connectable to the host device via a power transmission line and a data communication line.

At step 210, upon detection of the sink device being connected to the host device, a limited level of power is provided to the sink device over the power transmission line and an authentication test of the sink device is started. At step 220, if the sink device passes the authentication test, a normal level of power is provided to the sink device over the power transmission line (step 220a); if the sink device fails the authentication test, a level of power that is the same or less than the limited level of power is provided to the sink device over the power transmission line (step 220b). For example, a level of power equal to zero might be provided to the sink device if the authentication test is failed.

The host device might be configured to complete the authentication test within a maximum authentication time interval and the authentication test might be deemed to have failed if the maximum authentication time interval is exceeded before the authentication test has been completed. The maximum authentication time interval might be a pre-specified time interval or it might be adjustable during operation.

Figure 3:
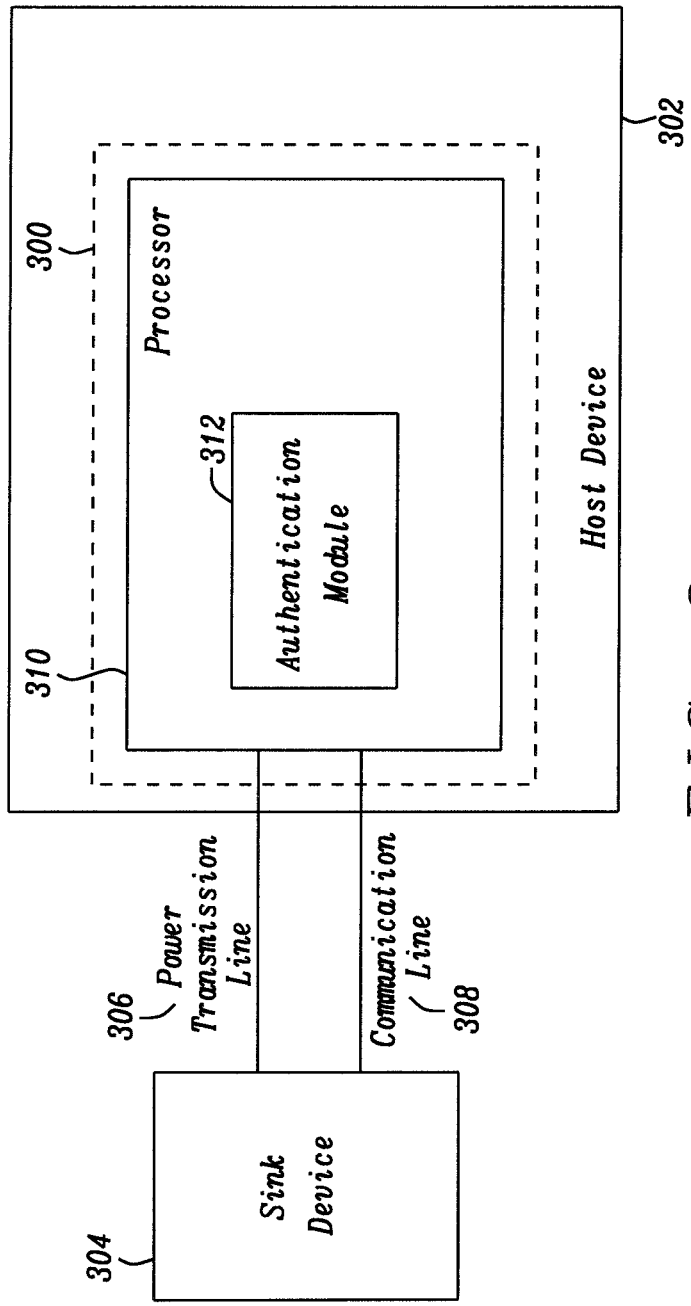
FIG. 3 shows a schematic of an apparatus for implementing the method of FIG. 2 and in accordance with one aspect of the present disclosure.

FIG. 3 illustrates a schematic of an apparatus 300 for implementing the method of FIG. 2 and in accordance with one aspect of the present disclosure. FIG. 3 shows a host device 302 connected to a sink device 304 via a power transmission line 306 and a data communication line 308. The sink device 304 may or may not be a malicious sink device. The apparatus 300 is configured to protect the host device 302 from one or more power surges transmitted from the sink device 304.

The apparatus 300 comprises a processor 310 which is adapted to control the power transmitted via the power transmission line 306 and to provide an authentication module 312. Upon detecting that the sink device 304 is connected to the host device 302, the processor 310 provides a limited level of power to the sink device 304 over the power transmission line 306 and starts an authentication test of the sink device 304 via the authentication module 312. If the sink device 304 passes the authentication test, the processor 310 stops limiting the power and provides a normal level of power to the sink device 304 over the power transmission line 306. If the sink device 304 fails the authentication test, the processor 310 provides a level of power to the sink device 304 that is the same or less than the limited level of power. For example, the processor 310 might provide a level of power that is equal to zero if the sink device 304 fails the authentication test.

It will be appreciated that the power transmission line 306 and the communication line 308 might correspond to one or more physical wires between the host and the sink device. Additional lines not shown in the FIG. 3 might connect the host device 302 and the sink device 304. For example, the lines 306 and 308 might be the VBUS line and the D+/D− differential lines of a USB connection. In some embodiments the USB connection might be a USB 3.0 connection comprising a total of 9 lines: a VBUS line, 3 differential pairs of data communication lines and two ground lines.

Although the apparatus 300 is represented as an internal component of the host device in the schematic of FIG. 3, the skilled person will appreciate that the apparatus 300 might not be physically embedded in the host device 302. The skilled person will also appreciate that the apparatus 300 might be implemented by both hardware and/or software components.

In some embodiments, the authentication module 312 is configured to complete the authentication test within a maximum authentication time interval and the authentication test is deemed to have failed if the maximum authentication time interval is exceeded before the authentication test has been completed.

Figure 4:
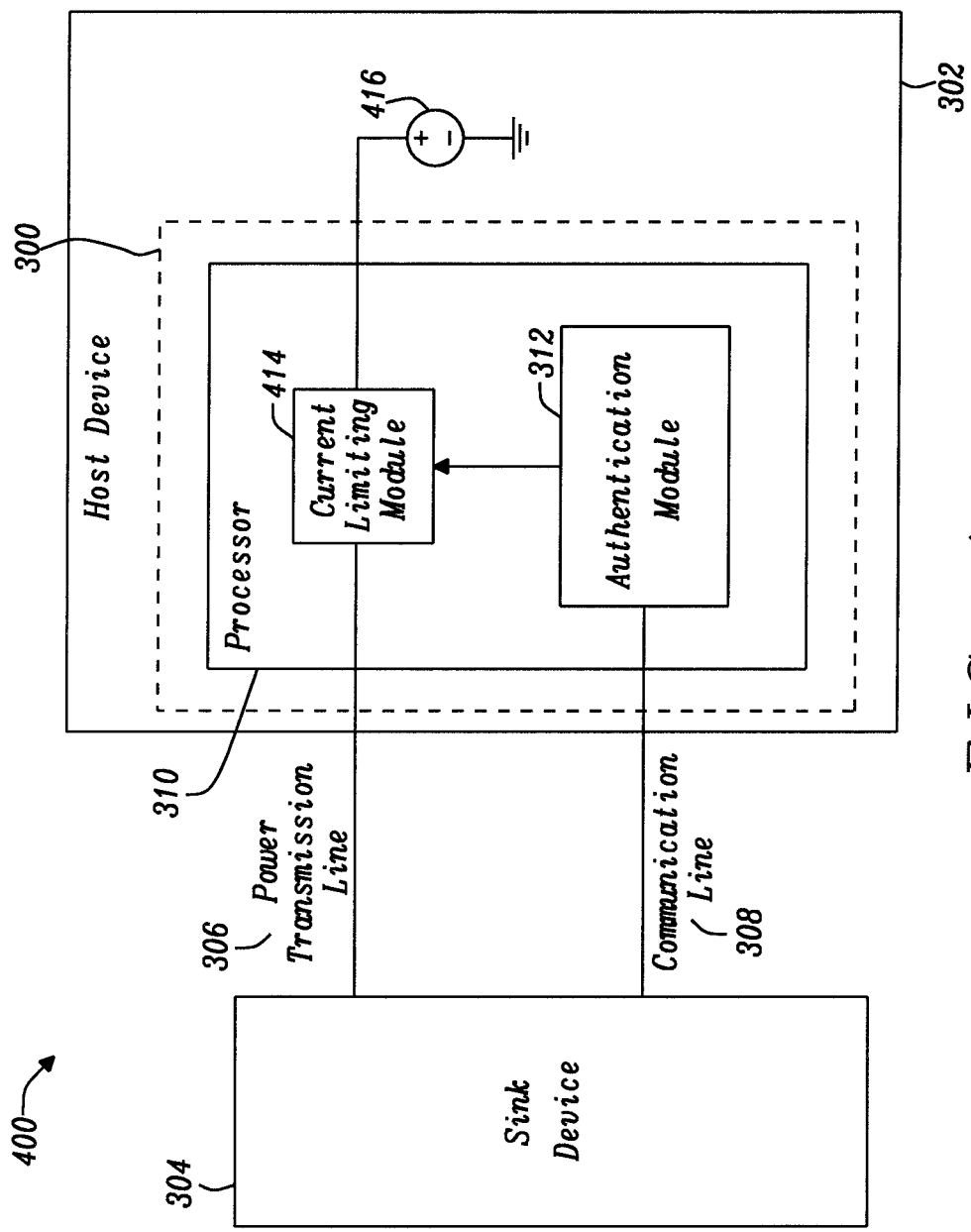
FIG. 4 shows a schematic of an embodiment of the apparatus of FIG. 3 in accordance with a first embodiment of the present disclosure.

FIG. 4 shows a schematic of a specific embodiment of the apparatus 300 in accordance with a first embodiment of the present disclosure.

The host device 302 of FIG. 4 comprises a current source 416 that is used by the host device to provide power to the sink device 304 over the power transmission line 306. In the embodiment of FIG. 4, the processor 310 comprises a current limiting module 414 and is configured to control the power transmitted over the power transmission line 306 by limiting the current provided to the sink device 302 by the current source 416 of the host device.

The current provided to the sink device 304 during the authentication test can be limited by any desired amount. In some embodiments, the current provided to the sink device 304 is limited to the minimum amount required for the sink device to complete the authentication test.

Figure 5:
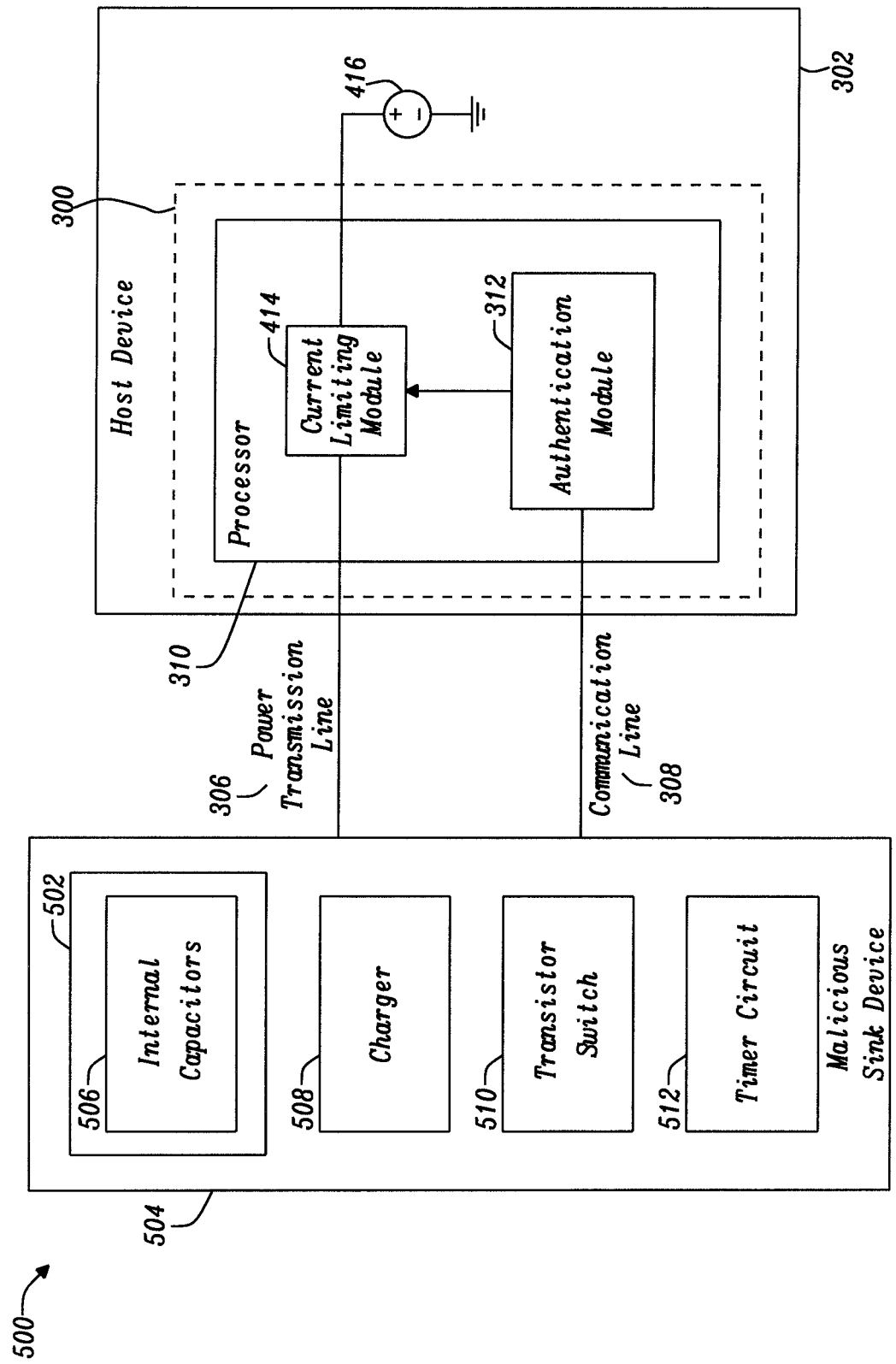
FIG. 5 shows a schematic of the embodiment of FIG. 4 coupled to a malicious sink device.

FIG. 5 shows a schematic of the embodiment of FIG. 4 coupled to a malicious sink device.

Here the host device 302 is connected to a malicious sink device 504 via a USB connection. The malicious sink device 504 is analogous to the malicious sink device of the measurements shown in FIG. 1 and is configured to build up a power reserve store and then discharge it over the data communication line 308. Optionally, the malicious sink device 504 comprises a component 502. The component 502 might comprise a plurality of internal capacitors 506 to store the power reserve.

The malicious sink device 504 might further comprise a charger 508 to charge the plurality of internal capacitors 506 and additional circuitry to control the discharge of the plurality of internal capacitors 506. For example, the malicious sink device 504 might comprise a transistor switch 510 and a timer circuit 512 that are configured to discharge the power reserve stored in the plurality of internal capacitors 506 over the data communication line via a series of pulsed attacks.

By using the apparatus 300, the first pulsed attack of the malicious sink device 504 can be delayed up to a time point that depends on how fast the malicious sink device builds up the power reserve and on the limited level of power that the apparatus 300 is configured to provide during the authentication test. The apparatus 300 might be configured to limit the power provided to the sink device by an amount such that the first pulsed attack is delayed long enough for the authentication module 312 to complete the authentication test before the attack is carried out. The apparatus 300 might further be configured to stop providing power to the malicious sink device in case the authentication test is failed, in order to prevent damages to the host device and/or the connection.

Figure 6A:
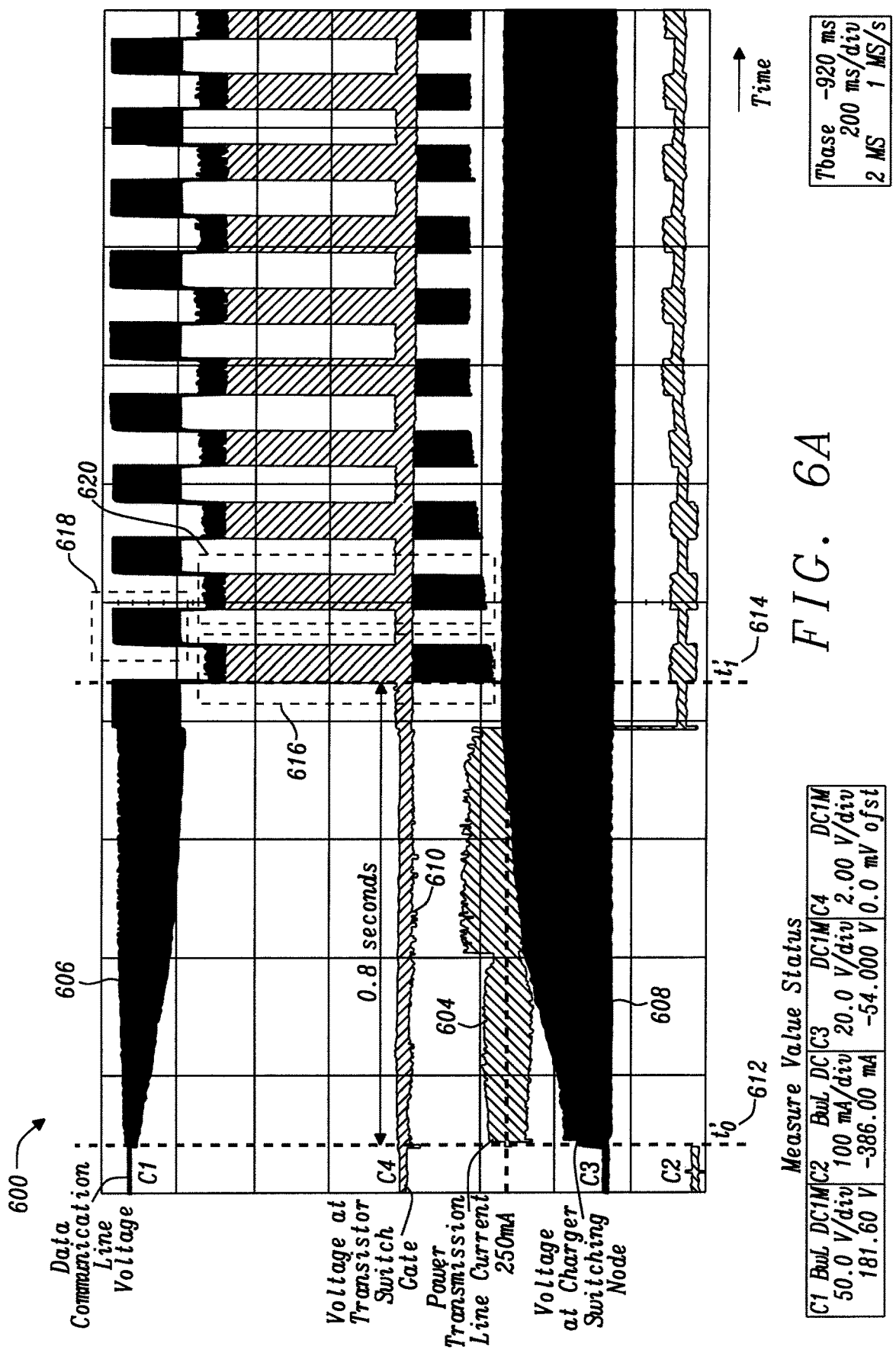
FIGS. 6*a* and 6*b* are measurements shows the effects of current limiting the power supply of the malicious device of FIG. 5.
Figure 6B:
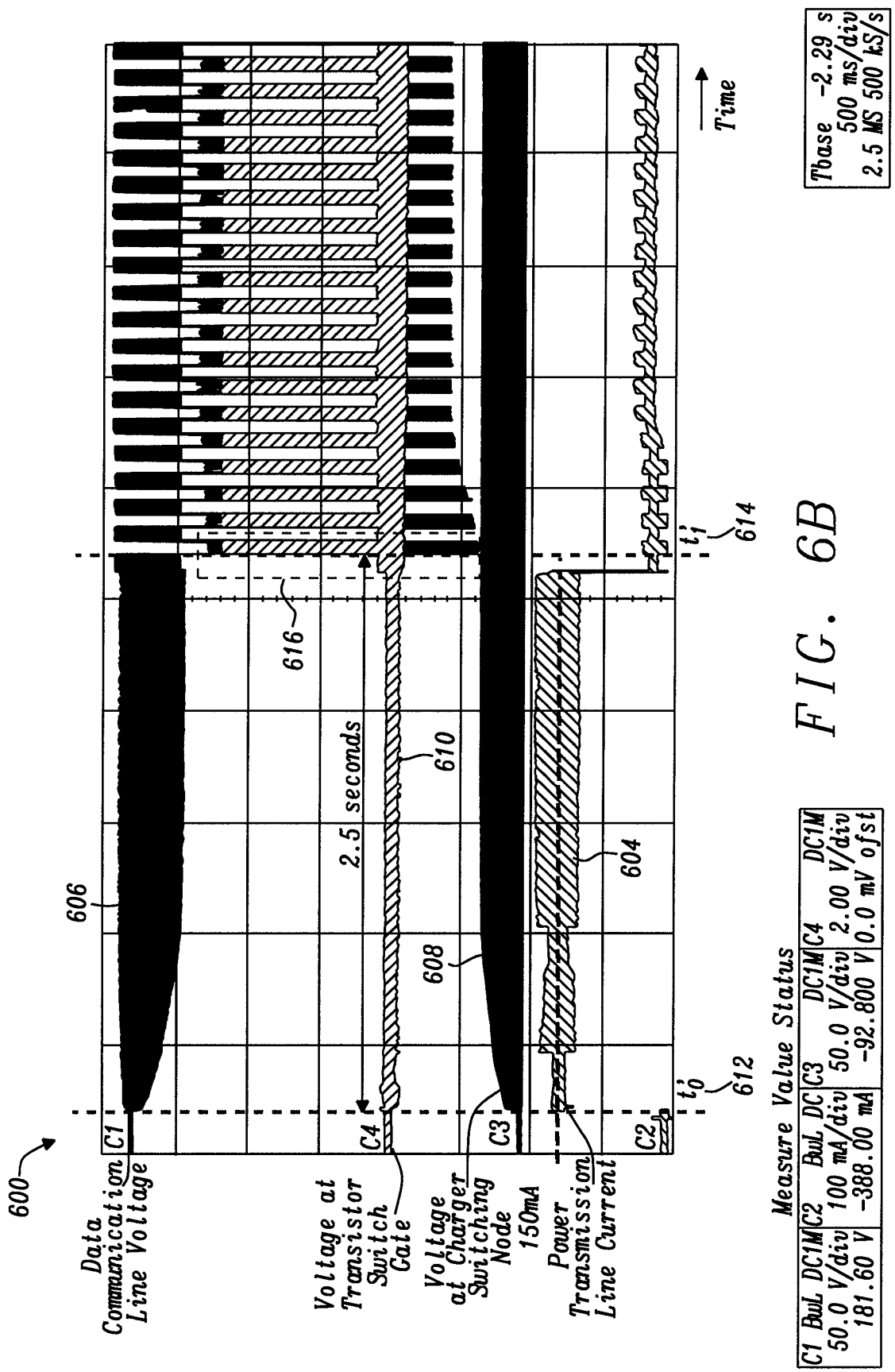

FIGS. 6a and 6b show measurements illustrating the working of the apparatus 300 of FIG. 5. The measurements shown in FIG. 6a, 6b are analogous to the measurements shown in FIG. 1. The line plot 604 is the current over the power transmission line 306 of the USB connection between the host device 302 and the malicious sink device 504. The line plot 606 is the voltage over the data communication line 308 of the USB connection. The line plot 608 is the voltage at a switching node of the charger 508 of the malicious sink device 504. The line plot 610 is the voltage at the gate of the transistor switch 510 of the malicious sink device 504.

In the measurements shown in FIG. 6a the apparatus 300 is configured to limit the current provided to the sink device over the power transmission line 306 to 250 mA.

At time $t_0'$ (point 612 on the x axis) the malicious sink device 504 is connected to the host device 302 and the authentication module 312 starts the authentication test. The host device also starts providing a limited level of power to the malicious sink device 504 over the power transmission line 306. The malicious sink device 504 stores some or all of this power to build up a power reserve in the internal capacitors 506. The power provided to the malicious sink device 504 from time $t_0'$ is limited by the current limiter 414 which is configured to only allow a current up to 250 mA. At time $t_1'$ (point 314 on the x axis), the power reserve built up in the internal capacitors 506 of the malicious sink device 504 reaches a level suitable for the malicious sink device 504 to carry out a first attack by discharging a sequence 616 of high power surges over the data communication line 308. After the first attack 616 the malicious sink device 504 restarts building up the power reserve (618) until enough power has been accumulated to carry out a second attack 620, and so on. The malicious sink device 504 might repeat this build-up/discharge cycle until it is disconnected from the host device.

By limiting the current provided to the malicious sink device, the time of the first attack occurs at 0.8 seconds after the time $t_0'$ at which the malicious sink 504 device is connected to the host device 302. For comparison, if the same malicious sink device were connected to the host device 302 without limiting the power provided to the malicious sink device, the first attack might take place at around 70 ms after the instant at which the malicious sink device is connected to the host device, as illustrated in the measurements shown in FIG. 1.

In the measurements shown in FIG. 6b, the apparatus 300 is configured to limit the current provided to the malicious sink device 504 over the power transmission line 306 to 150 mA and the time $t_1'$ of the first attack is delayed even further, up to around 2.5 seconds.

By limiting the current provided during the authentication test further and further, the malicious sink device is starved and the time of the first pulsed attack is delayed.

FIG. 7 is a table illustrating the dependency of the time of the first pulsed attack on the limited level of current provided to the malicious sink device 504 during the authentication test.

The column 710 is the limited level of current provided over the power transmission line 306 during the authentication test. The column 720 is the time interval between the time $t_0'$ at which the malicious sink device 504 is connected to the host device 302 and the time $t_1'$ at which the first attack is carried out. The column 730 is the voltage over the power transmission line after the time $t_0'$.

In a USB 3.0 the authentication test generally takes up to 500 milliseconds.

The table 700 shows how by further reducing the current provided to the sink device during the authentication it is possible to delay the first attack up to a point where it would only happen after 500 milliseconds, i.e. after the authentication test has been completed.

When the current is limited to 300 mA (row 740), the malicious sink device 504 is able to carry out the first attack at 0.3 seconds and the authentication test might not be finished yet. If the current is limited to 250 mA (row 750), which is the case illustrated in FIG. 6a, the first attack occurs at 0.8 seconds. Hence the apparatus 300 would be able to complete the authentication test and could cut the power supply to the malicious sink device 504 before the malicious sink device builds up enough power reserve to carry out an attack.

For all the limited levels of current in table 700 down to 150 mA (row 760), the voltage over the power transmission line 306 is 5 Volt, which is compliant with the requirements of the USB standard. By limiting the current to 100 mA or below (rows 770), the voltage over the power transmission line drops below 5 V. This is lower than the voltage requirements dictated by the USB standard to correctly enable the connection between a host and a sink device. Hence, the preferred window for the limited value of current is between 250 mA and 150 mA.

Starving the high voltage plugin device during the authentication test is an effective solution for a one-time connection of a malicious sink device, however the host device will still provide some amount of power to the sink device until the authentication test fails and the power supply is cut completely. The power reserve that the malicious sink device manages to build up during that time might stay stored in the malicious sink device even if it is disconnected from the host device. If the same malicious sink device is connected multiple times, the power reserve could progressively build-up to the minimum amount required by the malicious sink device to carry out an attack.

In order to prevent this, in some embodiments of the present disclosure the processor 310 of the apparatus 300 is further configured to protect the host device from a plurality of connections of the sink device. For example, the processor might be adapted to provide a counter configured to count the number of connections of the sink device. Furthermore, the processor might be adapted to interrupt the authentication test and/or cut the power supply to the sink device if a pre-defined number of connections is exceeded. Optionally the counter might count the number of connections within a counter time interval and reset the count to zero each time the counter time interval is exceeded.

The processor 310 might be configured to vary the limited level of power provided to the sink device during the authentication test based on the current value of the counter.

The authentication module 312 might be configured to reattempt the authentication test up to a maximum attempts number if the sink device 304 fails the authentication test.

Figure 8:
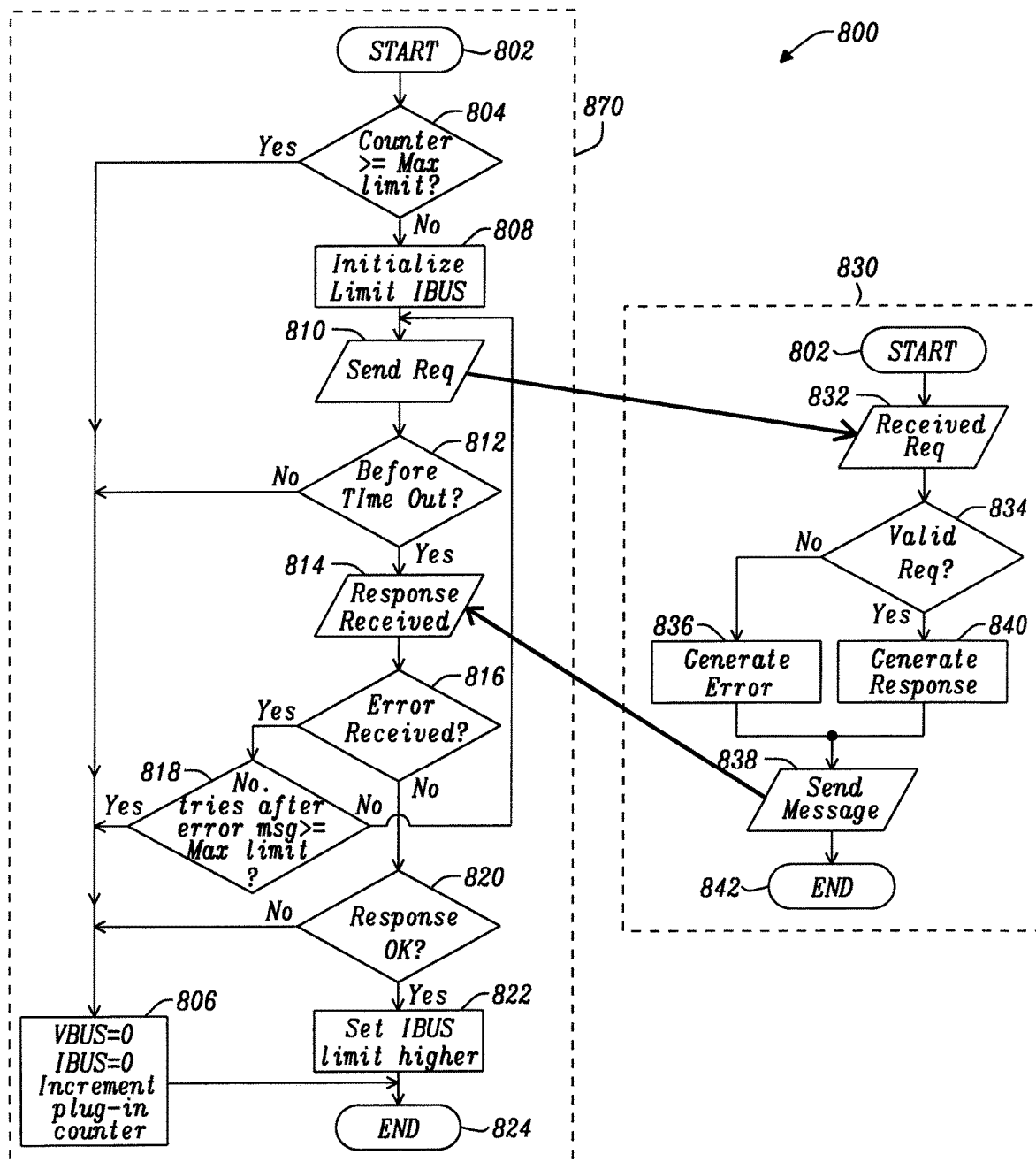
FIG. 8 is a diagram illustrating the working of an embodiment of the apparatus of FIG. 3 in accordance with a second embodiment of the present disclosure.

FIG. 8 is a diagram illustrating the working of a specific embodiment of the apparatus 300 and in accordance with a second embodiment of the present disclosure, wherein the processor 310 is configured to provide a counter as described above. The boxes 870 represent steps performed by the apparatus 300 and the boxes 830 represent steps performed by the sink device 304 wherein the sink device may or may not be a malicious sink device.

At steps 802 the sink device is connected to the host device. At step 804, the processor 310 checks whether the value of the counter has exceeded a maximum number of connections, wherein the maximum number of connections may be a pre-specified value or a value adjustable by the processor. If the maximum number of connections has been exceeded, the processor cuts the power supply to the sink device and increases the counter value by 1 (step 806). If the maximum number of connections has not been exceeded, the processor initializes the current limiting module, which limits the current IBUS provided to the sink device over the power transmission line (step 808).

At step 810 the processor sends an authentication request to the sink device. At step 812 the processor checks whether a maximum authentication time interval has been exceeded, wherein the maximum authentication time interval may be a pre-specified value or a value adjustable by the processor. If the maximum authentication time has been exceeded, the authentication test is deemed to be failed and the processor cuts the power supply to the sink device and increases the counter value by 1 (step 806). If the maximum authentication time has not been exceeded, the processor checks whether a response to the authentication request has been received by the sink device (step 814).

At step 816 the processor reads the response of the sink device and checks whether it is an error. An error means that the host device has failed to provide an interpretable authentication request to the sink device or that the sink device has failed to provide an interpretable response to the authentication request. If an error is detected at step 816, the processor checks whether a maximum attempts number has been exceeded (step 818): if it has, the processor cuts the power supply to the sink device and increases the counter value by 1 (step 806); otherwise, the authentication module reattempts the authentication test by sending a new authentication request to the sink device (810). The maximum attempts number might be a pre-specified parameter or a parameter adjustable by the processor 310. If no error is detected at step 816, the processor checks whether the response received by the sink device passes or fails the authentication test (step 820). If the authentication test is not passed, the processor cuts the power supply to the sink device and increases the counter value by 1 (step 806). If the authentication test is passed, the processor stops limiting the current IBUS and starts providing a normal level of current to the sink device over the power transmission line (step 822). At step 824 the process is terminated.

The authentication request sent by the apparatus 300 at step 810 is received by the sink device at step 832. At step 834 the sink device checks whether the received request is a valid request. If the request is found not to be valid, the sink device generates an error (step 836) and sends it in a message to the processor of apparatus 300 (step 838). The message is received by the processor at step 814. If the authentication request is found to be a valid request, the sink device generates a response (step 840) and sends it in a message to the processor of apparatus 300 (step 838). At step 842 the process is terminated.

The apparatus 300 might be used to protect any sort of host device, such as a phone, a tablet or a laptop. In particular, the apparatus 300 might be used to protect host devices that are connected to sink devices via on-the-go USB connections.

Figure 9:
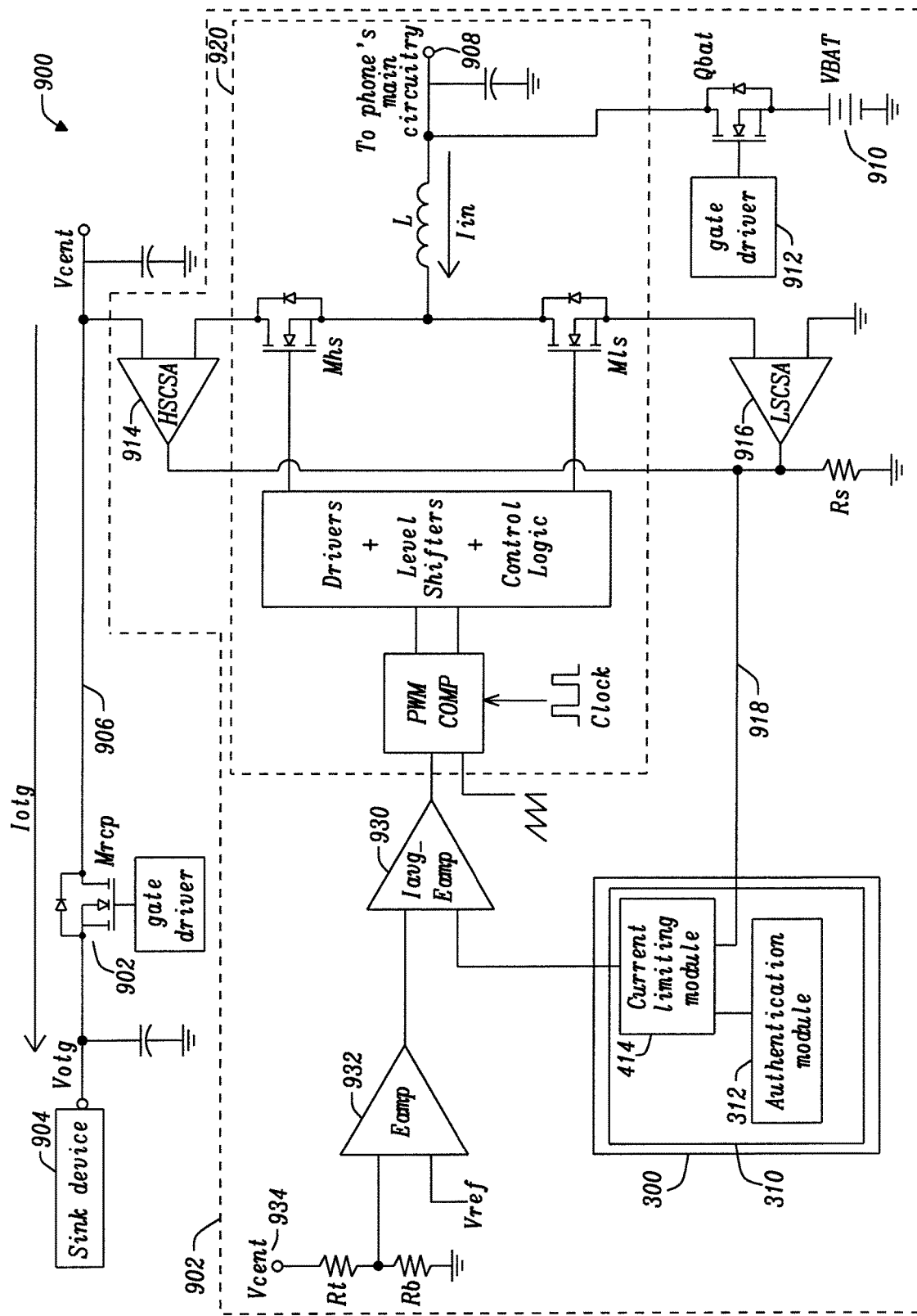
FIG. 9 is a schematic illustrating an example application of the embodiment of FIG. 4.

FIG. 9 is a schematic illustrating an example application of the apparatus 300 of FIG. 4. The schematic 900 shows a power transmission line 906 between a phone 902 and a sink device 904.

The phone 902 comprises a battery charger circuit 920 with reverse boost capability, a battery 910 and a battery switch 912. The battery switch 912 is connected to the battery 910 at one end and to the battery charger circuit 920 at the other end and is configured to connect or disconnect the battery from the battery charger circuit as required.

The battery charger circuit 920 is configured to operate as either a boost converter or reverse boost converter. When the battery charger circuit 920 operates as a boost converter, power is provided from either the battery 910 or the power transmission line 906 to the phone at output 908. When the battery charger circuit 920 operates as reverse boost converter, power is provided from the battery 910 to the power transmission line 906.

If a sink device 904 is connected to the phone 902, the battery charger circuit functions as reverse boost converter and provides power from the battery 910 to the sink device 904 over the power communication line.

The phone 902 further comprises a first current sense amplifier 914, a second current sense amplifier 916, a boost output current control loop 918, a first error amplifier 930 and a second error amplifier 932. The first and second current sense amplifiers are configured to sense the output current of the boost converter when operating in reverse and non-reverse mode respectively and to produce an output voltage that is proportional to the output current of the boost converter.

The outputs of the current sense amplifiers 914 and 916 are coupled to the boost output current control loop 918 which in turn is coupled to the apparatus 300. The apparatus 300 is configured to start an authentication test whenever the sink device 904 is connected to the phone 902 and to limit the current on the power transmission line 906 until the authentication module 312 has completed the authentication test.

The processor 310 is configured to limit the average current output by the boost converter to a limited level of current. In operation, the current limiting module receives in input the output of the current sense amplifiers and produces in output a voltage corresponding to the limited level of current. The output of the current limiting module is coupled to a first input of the first error amplifier. The second error amplifier 932 compares the voltage provided over the power transmission line 906 with a reference voltage 934 and outputs a signal proportional to the difference between the two. The output of the first error amplifier 932 is provided to a second input of the first error amplifier and compared to the first input. The output of the first error amplifier is a voltage dependent on the difference between its two inputs and is fed back into the battery charger circuit 920 in order to obtain the desired level of current on the power transmission line.

In conclusion, the present disclosure presented a protection apparatus that reduces the risk of damage to a host device and to components of an interface between the host device and a sink device when a sink device is connected to it by limiting the power provided to the sink device over the power supply lines of the interface until an authentication process has been completed.

A skilled person will appreciate that variations of the disclosed arrangements are possible without departing from the disclosure. Accordingly, the above description of the specific embodiment is made by way of example only and not for the purposes of limitation. It will be clear to the skilled person that minor modifications may be made without significant changes to the operation described.

What is claimed is:

1. A method for protecting a host device from one or more power surges transmitted from a sink device that is connectable to the host device via a power transmission line and a data communication line; the method comprising:
   upon detection of the sink device being connected to the host device:
      providing a limited level of power to the sink device over the power transmission line;
      starting an authentication test of the sink device;
      if the sink device passes the authentication test, providing a normal level of power to the sink device over the power transmission line; and
      if the sink device fails the authentication test, providing a level of power to the sink device over the power transmission line that is the same or less than the limited level of power;
   the method further comprising:
      protecting the host device from a plurality of subsequent connections of the sink device;
      providing a counter to count the number of subsequent connections of the sink device; and
      varying the limited level of power based on the current value of the counter.

2. The method as claimed in claim 1, wherein:
   the host device completes the authentication test within a maximum authentication time interval; and wherein
   the authentication test is deemed to have failed if the maximum authentication time interval is exceeded before the authentication test has been completed.

3. The method as claimed in claim 2, wherein the maximum authentication time interval is adjustable.

4. The method as claimed in claim 1, wherein if the sink device fails the authentication test, the level of power provided to the sink device over the power transmission line is zero.

5. The method as claimed in claim 1, wherein:
   the sink device comprises a component adapted to build up a power reserve from the power provided over the power transmission line;
   and wherein the limited level of power is dependent on the time required to build up the power reserve.

6. The method as claimed in claim 5, wherein:
   the component comprises an internal capacitor; and
   wherein the internal capacitor discharges the stored power on the data communication line.

7. The method as claimed in claim 1, wherein the limited level of power provided to the sink device over the power transmission line comprises a limited level of current.

8. The method as claimed in claim 1, wherein the host device is connectable to the sink device via a USB connection.

9. The method as claimed in claim 1, wherein the counter counts the number of connections within a counter time interval and to reset the count to zero each time the counter time interval is exceeded.

10. The method as claimed in claim 1, wherein:
    if the sink device fails the authentication test, the authentication test is reattempted up to a maximum attempts number.

11. The method as claimed in claim 10, wherein the maximum attempts number is adjustable.

12. The method as claimed in claim 1 wherein
    the host device is one of a phone, a tablet or a laptop;
    and wherein the host device comprises a battery charger circuit and a boost converter; and
    wherein the boost converter is reversible so as to provide power over the power transmission line when a sink device is connected to the host device.

13. An apparatus for protecting a host device from one or ore power surges transmitted from a sink device that is connectable to the host device via a power transmission line and a data communication line; wherein the apparatus comprises a processor device adapted to control the power transmitted via the power transmission line and to provide an authentication module, and wherein the processor device being configured to:
    upon detection of the sink device being connected to the host device:
    provide a limited level of power to the sink device over the power transmission line;
    start an authentication test of the sink device using the authentication module;
    if the sink device passes the authentication test, provide a normal level of power to the sink device over the power transmission line; and
    if the sink device fails the authentication test, provide a level of power to the sink device over the power transmission line that is the same or less than the limited level of power;
    and the processor device further being adapted to:
    protect the host device from a plurality of subsequent connections of the sink device;
    provide a counter, the counter being configured to count the number of subsequent connections of the sink device; and
    vary the limited level of power provided to the sink device based on the current value of the counter.

14. The apparatus as claimed in claim 13, wherein:
    the processor device is further configured to complete the authentication test within a maximum authentication time interval; and
    wherein the authentication test is deemed to have failed if the maximum authentication time interval is exceeded before the authentication test has been completed.

15. The apparatus as claimed in claim 13 wherein the processor device is adapted to provide a current limiting module and the limited level of power comprises a limited level of current.

16. The apparatus as claimed in claim 13, wherein the processor device is further configured to:
    if the sink device fails the authentication test, reattempt the authentication test up to a maximum attempts number.

* * * * *